United States Patent [19]

Harrison

[11] Patent Number: 4,915,133

[45] Date of Patent: Apr. 10, 1990

[54] VALVE DEVICE FOR PIPING SYSTEMS

[76] Inventor: C. L. Scott Harrison, 31 Riverside Dr., Wilmington, Del. 19809

[21] Appl. No.: 324,206

[22] Filed: Mar. 15, 1989

[51] Int. Cl.⁴ .................. F16K 5/06; F16K 11/087
[52] U.S. Cl. ........................... 137/625.47; 251/315
[58] Field of Search .................. 137/625.47; 251/315

[56] References Cited

U.S. PATENT DOCUMENTS

| | | |
|---|---|---|
| 1,232,767 | 10/1917 | Camfield et al. |
| 1,660,121 | 2/1928 | Fetter |
| 1,938,064 | 12/1933 | Carmine ........................... 182/22 |
| 3,684,241 | 8/1972 | Hartman et al. ............ 137/625.27 X |
| 3,936,892 | 2/1976 | Miller ............................... 4/256 |
| 4,573,498 | 3/1986 | Ludwig ..................... 137/625.47 X |
| 4,760,614 | 8/1988 | Harrison ............................. 4/255 |

FOREIGN PATENT DOCUMENTS 482593  5/1951 Canada.

*Primary Examiner*—Arnold Rosenthal
*Attorney, Agent, or Firm*—Dann, Dorfman, Herrell and Skillman

[57] ABSTRACT

A valve device adapted for insertion at one or more specified locations in a pipe system. The device is adjustable into three positions: in the open position affording normal operation of the pipe system; in a first closed position affording connection of external pressure fluid to the system at one side of the location; and a second closed position affording connection of external pressure fluid to the system at the other side of the location. The device is in the nature of a ball valve with a spherical valve element having means for connecting pressure fluid through the valve housing into the system when the valve is in either of the first and second closed positions.

9 Claims, 2 Drawing Sheets

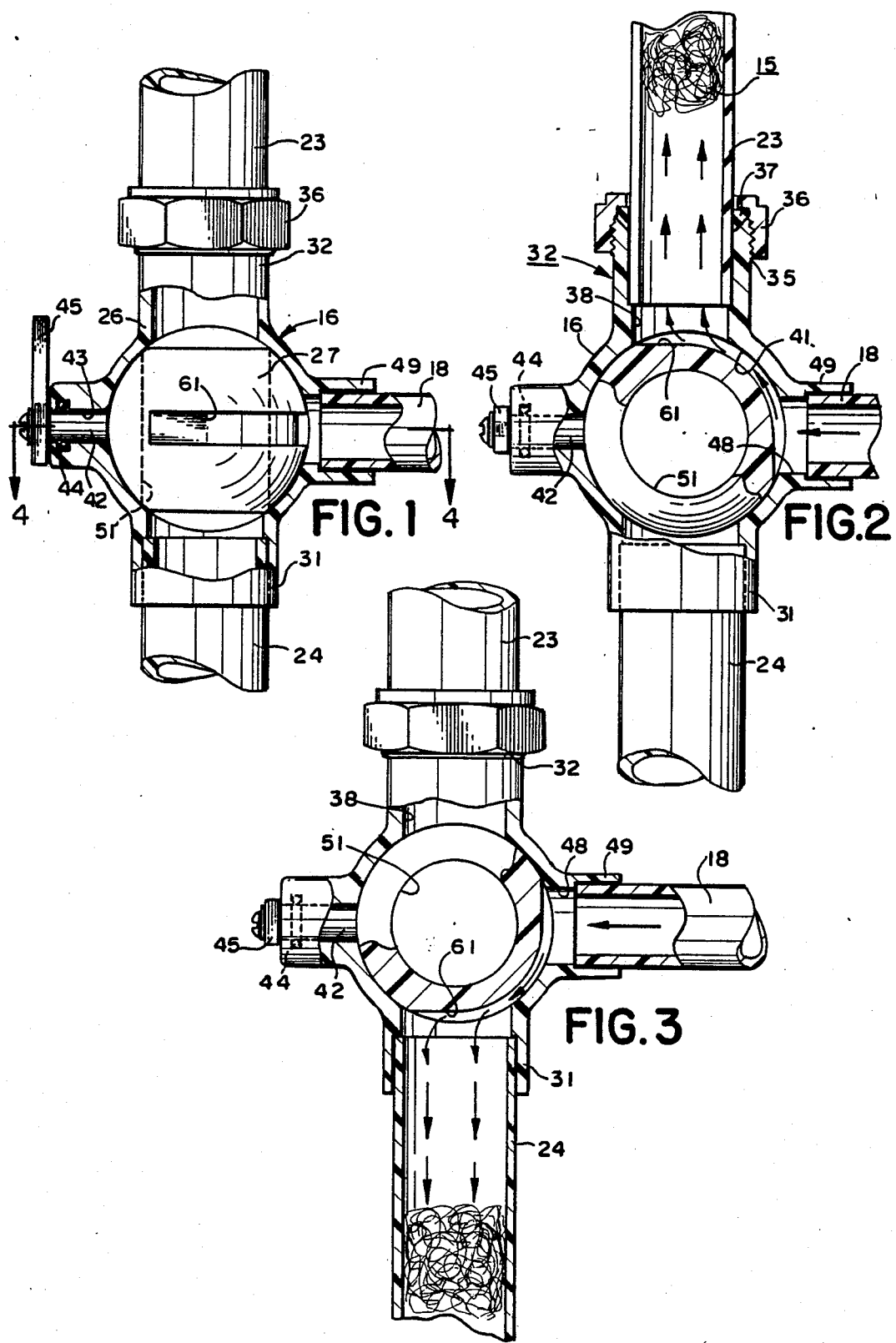

VALVE DEVICE FOR PIPING SYSTEMS

FIELD OF THE INVENTION

The present invention relates to plumbing systems and has particular application to a valve adapted to be inserted into a piping system for applying localized pressure to one portion or another of the piping system.

BACKGROUND OF THE INVENTION

My prior U.S. Pat. No. 4,760,614 discloses a device consisting of an elongated tube adapted to replace a portion of the piping system. The tube has a through bore with a gate valve along with passageways paralleling the bore and extending from above and below the bore, respectively, to a valve alternatively and selectively connecting the passageways to a supply of pressure fluid so that the pressure fluid may be introduced into the bore of the tubular member either above or below the gate valve.

The device of my earlier patent is not entirely satisfactory because the mounting of the device in a pipe system requires the replacement of a substantial length of piping in the system with the patented device, and for proper operation of the device, it was necessary to coordinate operation of the gate valve with the operation of the three-way valve for controlling the pressure fluid.

SUMMARY OF THE INVENTION

The present invention provides a unitary device which may be inserted at one or more positions within a piping system to afford localized pressurization of the system at one side or the other of the device, or, alternatively, normal operation of the system without the introduction of pressure fluid thereinto.

More specifically, the present invention provides a device in the nature of a ball valve having a single operator for displacing the valve element and for adjusting the device to introduce pressure fluid into the piping system alternatively on either side of the ball valve.

In the preferred embodiment of the present invention, the device includes a valve housing having fittings on opposite sides which may be coupled to an existing section of the piping system by simply removing a short length of the piping system and mounting the housing in line with the pipe sections at opposite sides of the removed part.

The device of the present invention is of simplified construction comprising a single housing having oppositely-directed couplers for attachment to the piping system, a socket for receiving a ball valve element therein, the valve element having a through-bore which may register in open position with the couplers to provide through flow through the housing without interruption; and inlet means for connection to a source of pressure fluid, either gaseous or liquid, the valve element including a passageway interconnecting the inlet with one coupler when the valve is in a first closed position, with the other coupler when the valve is in a second closed position and with the socket wall when the valve is in the aforesaid open position in which the bore of the valve element provides through flow.

BRIEF DESCRIPTION OF THE DRAWINGS

All of the objects of the invention are more fully set forth hereinafter with reference to the accompanying drawings, wherein:

FIG. 1 is a front view of a device made in accordance with the present invention in the open position, with portions broken away to illustrate the internal construction thereof;

FIG. 2 is a sectional view of the device shown in FIG. 1 in the first closed position;

FIG. 3 is a sectional view of the device as shown in FIG. 1 in the second closed position;

DESCRIPTION OF THE PREFERRED EMBODIMENTS

The present invention provides a device which may be incorporated in a piping system to facilitate the clearing of blockages which may occur in the system. My earlier U.S. Pat. No. 4,760,614 illustrates a device which replaces a section of pipe between a plumbing appliance and a trap. The patented device includes a gate valve and has means for directing water pressure alternatively into the pipe either above or below the gate valve, depending upon the location of the blockage. The present invention provides a device which may be inserted at one or more positions within a piping system, and is suitable for applying not only water pressure, but also air pressure, if the water pressure is not sufficient to dislodge the blockage. The device may also be used for industrial piping systems which convey liquids which may tend to solidify. The present invention enables the application of pressure along with a suitable solvent to dissolve any solidified material within the system. To this end, the device of the present invention is designed to be quickly and easily inserted into a piping system at any point throughout its length.

Figure 6:
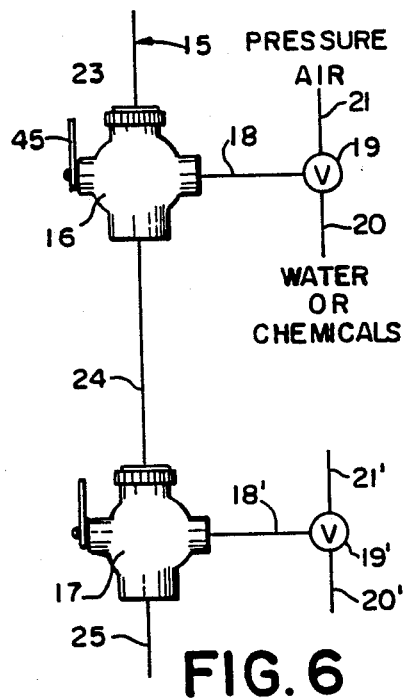
FIG. 6 is a diagrammatic view illustrating the positioning of two devices in a piping system to enable application of a selected pressure or the supply of treatment chemicals to three separate sections of a piping system.

Referring now to the drawings, and particularly FIG. 6, the piping system is designated at 15 and has inserted into it separate devices 16 and 17 for clearing the system of blockages. Each of the devices 16 and 17 has a connection line 18 leading to a valve 19 which alternatively connects the pressure line 18 with either a liquid supply line 20 or a pressure air line 21. As described more fully hereinafter, by operating the valve 19 between its alternate positions, pressure air from the line 21 or liquid pressure fluid from the line 20 may be introduced into the connection line 18 to the valve device 16. The valve device 17 has a similar connection line 18' connected to a valve 19' with an air line 21' and a liquid line 20'.

Each of the valve devices 16 and 17 has a normally open position which affords open communication between the upper section 23 of the piping system 15 and the intermediate section 24, and also between the intermediate section 24 and the lower section 25. Thus, when both valve devices 16 and 17 are in the normally open position, the piping system 15 functions normally to provide fluid flow throughout the system between the sections 23, 24 and 25. Each of the valve devices 16 and 17 also has two separate closed positions, to be described more fully hereinafter. When in either of the closed positions, the valve device 16 isolates the section 23 from the section 24 by closing the communication between these sections. Likewise, when the valve device 17 is in either of its closed positions, the sections 24 and 25 are isolated from each other.

In accordance with the invention, pressure fluid may be introduced into either valve device to apply a pressure selectively to the sections of the piping systems above and below the valve device. For example, with the valve device 16, pressure from the connection line 18 may be applied to the section 23 above the valve device 16 when the valve is in one of its closed positions and may be applied to the section 24 below the valve device 16 when the device is in the other of its closed positions. When the valve is in its open position, the pressure from the connection line 21 is isolated from both sections 23 and 24 so as to interrupt the communication between the piping system 15 and the connection line 18.

As described in my earlier patent, the pressure applied to the system 15 may be used to dislodge blockages in the system. The device of the present invention is also useful in testing piping systems in that it is possible to isolate separate sections of the piping system and subject the system to compressed air which may then determine the fluid-tightness of that particular section. Thus, when installing the piping system, the valve devices of the present invention may be inserted at strategic locations throughout the system, and when it is desired to test the system for fluid-tightness, the valves may be closed at opposite ends of a particular section and pressure fluid introduced into the section through the device at one end of the section and a pressure reading may be taken through the device at the other end of the section. By comparing the reading at the other end relative to the pressure applied at the one end, it is possible to ascertain the fluid-tightness of the system. The device of the present invention is designed to be produced at minimal cost so that it is economically feasible to incorporate a plurality of such devices in a piping system.

Referring now to FIGS. 1–3, which shows the device 16, the assembly consists essentially of two parts, a housing 26 and a valve element 27. The housing has a coupler 31 at one end for connection to one section, for example the section 24 of the piping system, and a coupler 32 at the other end for connection to another section, for example the section 23 of the piping system. In the present instance, the coupler 31 comprises a telescopic sleeve adapted to be engaged over the end of the pipe section 24 and cemented thereto. The coupler 32 at the other end, however, comprises a compression fitting having an externally-threaded sleeve 35 (see FIG. 2) and a cooperating threaded collar 36 which compresses a suitable packing material 37 between the sleeve 35, the outside of the tube section 23, and the inside of the threaded collar 36. In this fashion, the illustrated embodiment of the valve device 16 permits the device to be uncoupled from the pipe section 23, for example to facilitate removal of materials which might be dislodged from the pipe section 23 during the operation of the device.

In the valve device 16, the coupler 32 is connected to the coupler 31 by a through-bore 38 in the housing 26 which preferably has an inside diameter corresponding approximately to the inside diameter of the piping system 15. The through-bore 38 and the sections 23 and 24 are preferably axially aligned to provide a straight-through flow along the axis of the through-bore 38.

Figure 5:
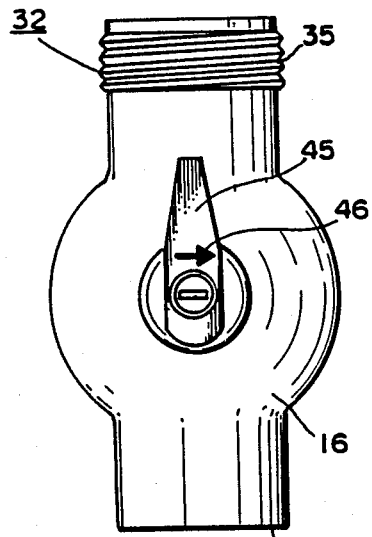
FIG. 5 is a side view of the device shown in FIG. 1 removed from the piping system.

Intermediate the couplers 31 and 32, the housing 26 provides a spherical socket 41 in which a spherical valve element 27 is fitted. The spherical valve element is mounted for rotation about a rotary axis transverse to the axis of the through-bore 38. To this end, the valve element 27 is provided with an axial stem 42 which is guided for rotation within a cylindrical journal 43 provided at one side of the housing socket 41. A suitable sealing element 44 is provided between the journal 43 and the valve stem 42 so that the stem 42 may project out of the housing for attachment to a handle 45, as shown in FIGS. 1 and 5. The handle 45 affords rotation of the valve element 27 about its rotary axis. On the other side of the spherical socket 41 of the housing 26, a cylindrical recess 48 provides a pressure chamber having a receptacle 49 to which the connection line 18 may be connected to provide a passage between the line 18 and the chamber 48.

The valve element 27 is spherical to be rotatably mounted within the spherical socket 41 of the housing. The valve element 27 has a through-bore 51 which, in the open position shown in FIG. 1, registers with the through-bore 38 of the housing 16. The diameter of the through-bore 51 corresponds to the diameter of the through-bore 38 so as to provide in the open position of the valve device 16 an unimpeded flow passage between the couplers 31 and 32 and, therefore, unimpeded flow between the sections 23 and 24 of the piping system 15. The through-bore 51 extends diametrically through the spherical valve element 27 as viewed in the transverse cross-section through the axis of the through-bore.

Figure 4:
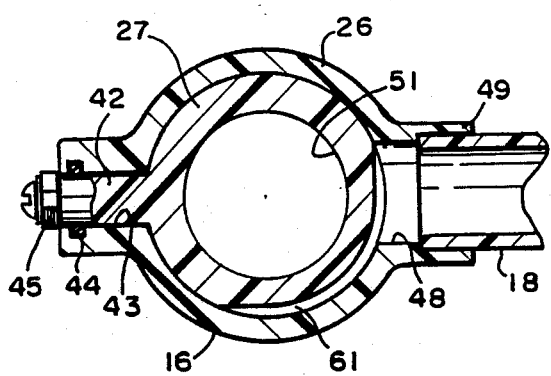
FIG. 4 is a transverse sectional view taken on the line 4—4 of FIG. 1.

Positioned 90° about the periphery of the spherical valve element 27 midway between the open ends of the through-bore 51, a groove 61 is provided in the outer periphery of the valve element. The groove 61 is open at its outer side to provide a port at one end of the groove which may communicate with either the upper or lower end of the through-bore 38 of the housing, depending upon the position of the valve element. When in the position of FIG. 2, the port provided by the groove 61 communicates with the section 23 of the piping system and, when in the position of FIG. 3, the port provided by the groove 61 communicates with the section 24 of the piping system. When the valve element is in the closed position as shown in FIGS. 1 and 4, the port of the groove confronts the spherical wall of the socket 41 and is closed against fluid flow therethrough.

The groove 61 provides a pressure fluid flow passage communicating with the pressure chamber 48 in the housing. As shown in FIGS. 2 and 3, the fluid in the pressure chamber 48 at the righthand side of the housing 16 may communicate through the groove 61 with the through-bore 38 at either of its ends connecting with the coupler 31 or the coupler 32. When positive pressure is supplied through the valve 19 to the connection line 18, the positive pressure is transferred either above or below the valve as determined by the setting of the valve element. Similarly, if negative pressure, i.e., pressure fluid at a pressure below atmospheric pressure, is supplied to the chamber 48 through the inlet 18, a suction is applied to the pipe system either above or below the valve device 16. For example, if there is a blockage in the section 24 between the valve devices 16 and 17, a positive pressure may be applied at the upper end of the section 24 and a negative pressure may be applied at the lower end of the section 24 so as to double the force applied to the blockage therebetween. If the blockage is simply displaced towards the valve device 17, the device 17 may be uncoupled from the section 24 so that the blockage may be discharged through the uncoupled pipe section 24. If it is desired to evacuate a section of the system between two valve devices, for example to make repairs, one of the valve devices may be connected to positive air pressure and the other may be connected to negative air pressure to effect evacuation of the section without uncoupling the pipe section.

To facilitate operation of the device, the handle 45 is preferably provided with an indicia 46 which indicates the position of the groove 61. For example, in FIG. 5 the indicia comprises an arrow head which points to the side of the casing to indicate that the groove 61 is blocked by the valve housing. When the handle is rotated counterclockwise, the indicia 46 points upwardly to indicate that the pressure from the inlet 18 is directed upwardly, and when the handle is rotated 90° clockwise from the position of FIG. 5, the indicia points downwardly to indicate that the pressure is directed downwardly.

From the foregoing description, it is apparent that the present invention provides a valve device which is of simple construction and yet has numerous operational advantages which permit effective control of blockages within a piping system. Not only does the valve device of the present invention afford application of pressure to the system to dislodge or otherwise dispose of blockages, but also permits the pressure testing and/or evacuation of individual sections of the system without dismantling the system. Furthermore, the same device may be used as a portable attachment to apply localized pressure to an existing pipe system. The through-bore of the device may be coupled to an existing tap or other opening in the system and pressure fluid may be injected through the pressure chamber to apply pressure to the system.

While a particular embodiment of the present invention has been herein illustrated, it is not intended to limit the invention to such disclosure, but changes and modifications may be made therein and thereto within the scope of the following claims.

I claim:

1. A device for selectively applying pressure from a source of pressure fluid to different sections of a piping system providing a conduit for fluid flow, comprising:
   a valve housing having a through bore and means to couple said housing into said piping system at a selected location between said sections so as to connect the opposite ends of said through bore respectively with the conduits of said different piping system sections, a pressure fluid chamber separated from said bore, and means to connect said source of pressure fluid to said chamber;
   a valve element mounted in said housing for selective movement, said valve element having a first though passage and a second pressure-fluid passage;
   means to selectively position said valve element in three positions: an open position, a first closed position and a second closed position;
   in the open position of said valve element, said first passage being in registry with said through-bore, and said second passage isolating said pressure chamber from either of said opposite ends of said through bore;
   in the first closed position of said valve element, said first passage being out of registry with said through-bore, and said second passage connecting said chamber with one of said opposite ends of said through-bore to thereby connect said one end of the through-bore with said source of pressure fluid; and
   in the second closed position of said valve element, said first passage being out of registry with said through bore, and said second passage connecting said chamber with the other of said opposite ends of said through-bore to thereby connect said other end of the through-bore with said source of pressure fluid.

2. A device according to claim 1 wherein each of the piping system sections has a flow passageway of a given diameter, said through bore of the housing and the through passage of said valve element having a diameter corresponding to the given diameter of said conduit, said coupling means positioning said flow passageways and said through-bore of the housing along a common longitudinal axis.

3. A device according to claim 2 wherein said valve element has a central rotary axis perpendicular to said common axis, the transverse cross-section of said valve element at said common axis being circular and concentric with the rotary axis of the valve element, said through passage of the valve element being disposed diametrically of said circular cross-section, said pressure fluid passage of the valve element comprising a groove providing a port in the outer periphery of said valve element at a position substantially 90° from the axis of the through passage, said groove extendinq from said port in a direction generally parallel to the rotary axis of said valve element.

4. A device according to claim 3 wherein said housing includes a journal concentric with the rotary axis of said valve element at one side of said through bore of the housing to mount said valve element for rotation therein,
   said fluid chamber being positioned on the opposite side of said housing along said rotary axis, said second passage groove communicating directly with said chamber at one end and with said port at the other end,
   said port registering respectively with the opposite ends of the through-bore in said first and second closed positions of said valve element,
   in the open position of said valve element said port being closed by the valve housing.

5. A device according to claim 4 wherein said journal comprises a hollow cylindrical recess on one side of said housing and said pressure fluid chamber comprises a hollow cylindrical recess on the other side of said housing.

6. A device according to claim 4 wherein said valve element is generally spherical with a stub shaft projecting outwardly along said rotary axis to seat in said journal, said means to selectively position said valve element comprising a handle connected to said stub shaft.

7. A device according to claim 6 wherein said handle comprises a cross bar generally parallel to said through passaqe for positioning said valve element selectively in any one of said three positions, said cross bar having indicia to indicate the position of said port.

8. A device according to claim 1 wherein said means to connect pressure fluid to said chamber comprises a receptacle on said housing adapted for connection of said source of pressure fluid thereto, said receptacle having a passage communicating with said pressure chamber.

9. A device for selectively applying pressure to different sections of a piping system providing a conduit for fluid flow, comprising:
- a valve housing having a through-bore disposed along a longitudinal axis and means to couple said housing into said piping system at a selected location between said sections so as to connect the opposite ends of said through-bore respectively with the conduits of said different piping system sections, and a pressure fluid chamber separated from said bore;
- a valve element mounted in said housing for selective rotary movement about a rotary axis perpendicular to said longitudinal axis, said valve element having a first through passage having a passage axis perpendicular to said rotary axis, and a second pressure-fluid passage;
- means to selectively position said valve element in three positions: an open position, a first closed position and a second closed position;
- in the open position of said valve element, said passage axis being in registry with said longitudinal axis, and said second passage isolating said pressure chamber from either of said opposite ends of said through-bore;
- in the first closed position of said valve element, said passage axis being transverse to said longitudinal axis so that said first passage is out of registry with said through-bore, and said second passage connecting said chamber with one of said opposite ends of said through-bore;
- in the second closed position of said valve element, said passage axis being transverse to said longitudinal axis so that said first passage is out of registry with said through bore, and said second passage connecting said chamber with the other of said opposite ends of said through-bore; and
- a handle for displacing said valve element selectively into any one of said three positions, comprising a cross bar parallel to said passage axis, and indicia to indicate the position of said second passage relative to the opposite ends of said through bore.

* * * * *